July 1, 1930.  C. M. GAXIOLA  1,768,755
PICTURE ENLARGING APPARATUS
Filed Aug. 16, 1927  2 Sheets-Sheet 1
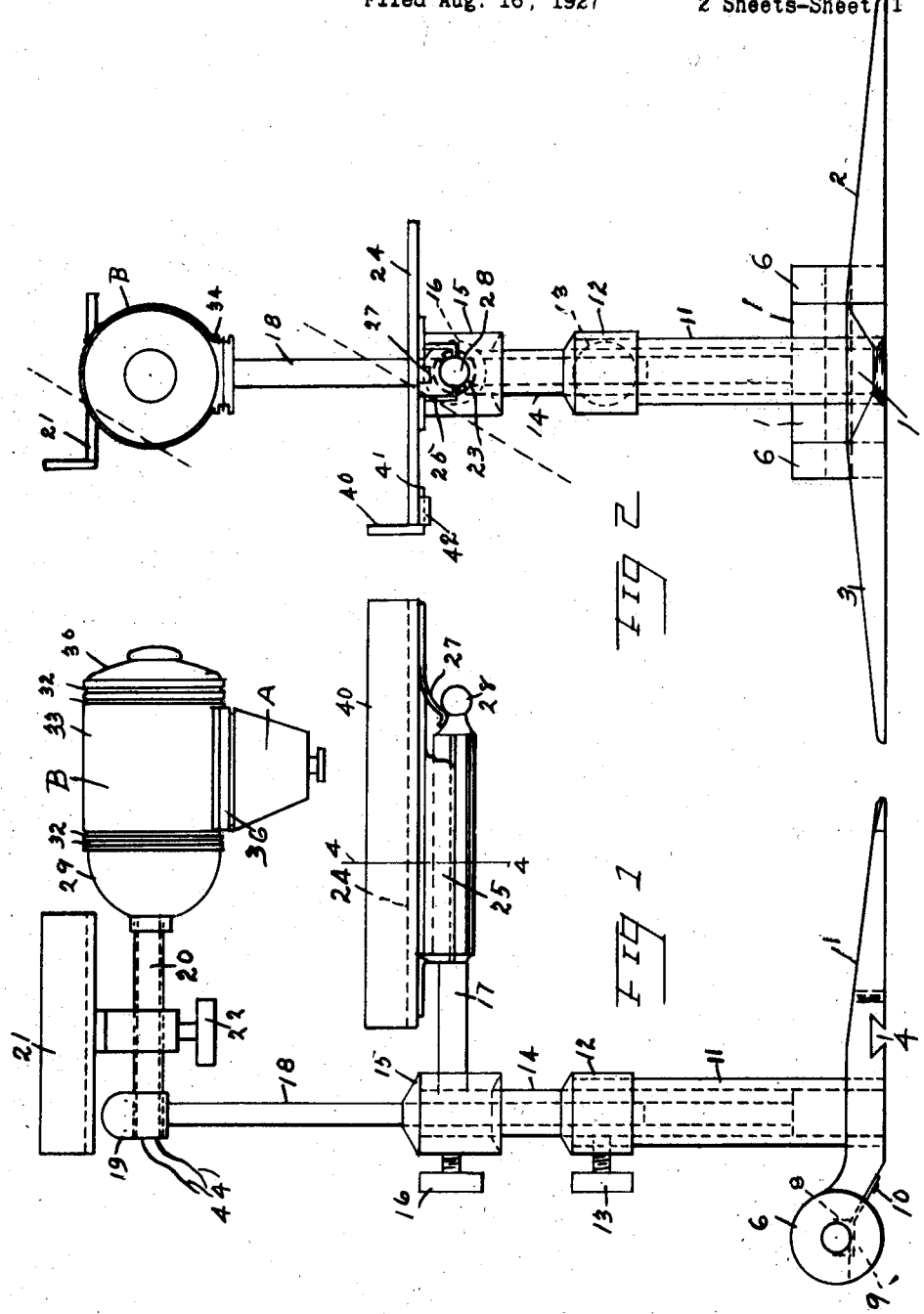

July 1, 1930.  C. M. GAXIOLA  1,768,755
PICTURE ENLARGING APPARATUS
Filed Aug. 16, 1927  2 Sheets-Sheet 2
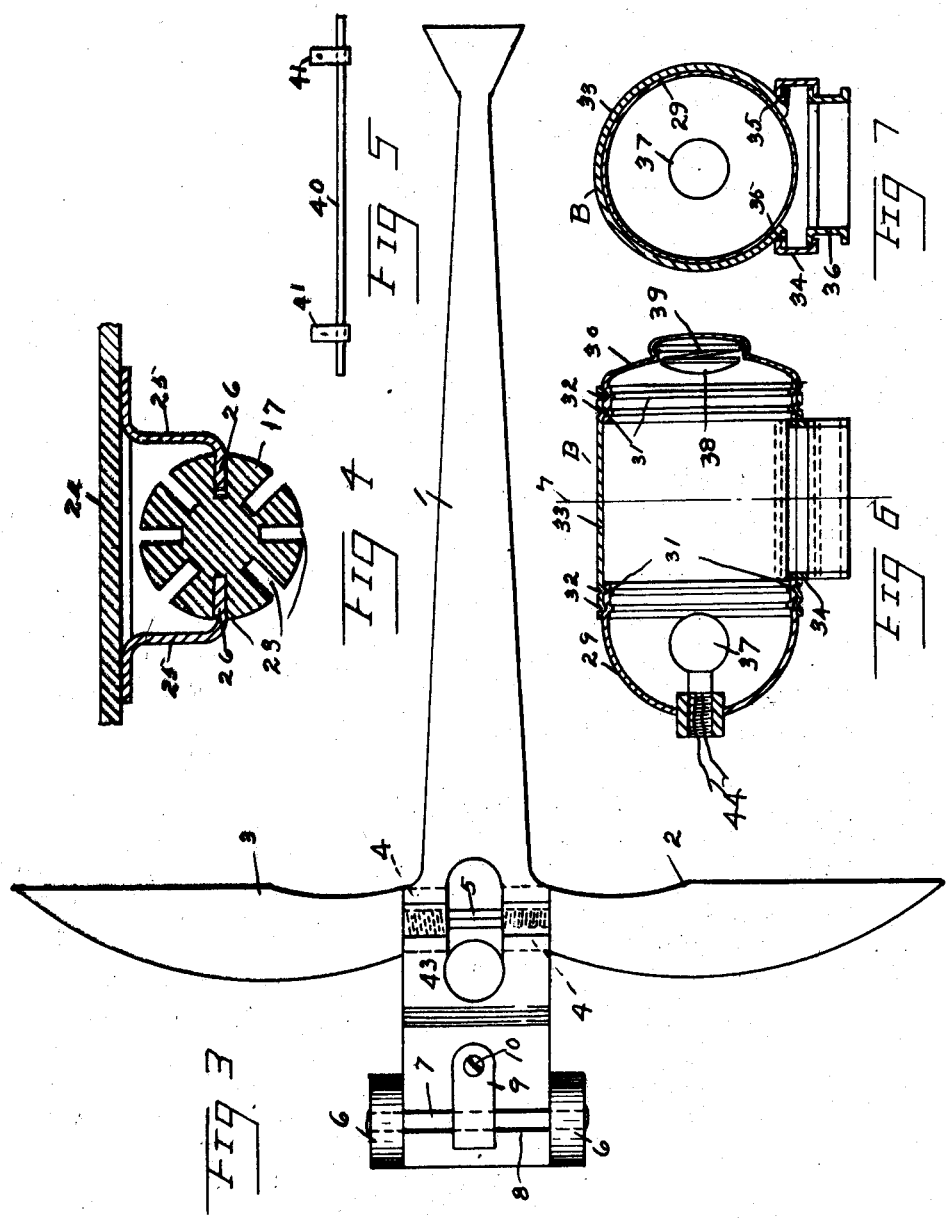
Carlos M. Gaxiola
Inventor
By F. L. Horspool
Attorney Patented July 1, 1930

1,768,755

UNITED STATES PATENT OFFICE

CARLOS M. GAXIOLA, OF SALT LAKE CITY, UTAH

PICTURE-ENLARGING APPARATUS

Application filed August 16, 1927. Serial No. 213,334.

The invention relates to a picture enlarging apparatus for the enlarging of photographs by the use of a light and an ordinary camera attached to it and to be used in homes by amateurs.

The object of this invention is to provide a picture enlarging apparatus with an improved reflector and lamp case, which is more economical to manufacture and more effective in use, more easily operated than other enlarging apparatus now used, and to construct a picture enlarging apparatus which will evenly illuminate a negative and the projected field to avoid uneven heating or warping of a film negative or breaking a glass negative, and which will employ an Ansco camera or an other standard make camera attached to a lamp case in which a lamp and a reflector is placed for the enlarging of a picture, and to avoid the expense of having beside the camera a special enlarging camera for the home.

Another object of this invention is to provide a picture enlarging apparatus for the home, when not used for the enlarging of pictures, the camera can be removed and the apparatus used for many other purposes, such as a reading stand, a dining stand or a book stand for a sick bed, a study stand or a writing desk and many other useful means of using.

With these and other objects in view, the invention consists of certain novel features of construction as hereinafter fully described and claimed.

In the accompanying drawing forming a part of this specification and in which corresponding parts are denoted by like reference characters, is illustrated the preferred form of embodiment of the invention capable of carrying the same into practical operation, it being understood that the invention is not necessarily limited thereto, as various changes in the shape, proportions and general assemblage of the parts may be resorted to without departing from the principles of the invention or sacrificing any of its advantages, and the right is therefore reserved for making all changes and modifications which will fairly fall within the scope of the invention and claims made therefor.

Referring to the drawing.

Figure 1 is a side elevation of the invention.

Fig. 2 is a front view of Fig. 1 with camera A removed.

Fig. 3 is an enlarged view of the under side of the base 1 showing means for securing wheels 6 and side braces 2 and 3 thereto.

Fig. 4 is an enlarged view on line 4—4 Fig. 1 showing a table top 24 in place.

Fig. 5 is a bottom view of guard 40.

Fig. 6 is an enlarged sectional view of the lamp case B and Fig. 7 is a view on line 7 Fig. 6.

The invention comprises in combination with a camera A a lamp case B to which a camera is attached. A lamp 37 placed in one end of the lamp case and a reflector 38 placed in the other end of the lamp case. A support for the lamp and case comprising sections 11, 14, 18 and 20. On the upper end of section 11 is placed a cap 12 through which a thumb screw 13 is operated for securing section 14 within section 11. On the upper end of section 14 is also placed a cap 15 through which a thumb screw 16 is operated for securing section 18 into section 14, thus said sections telescope each other.

Section 18 has a cap on its upper end in which is secured one end of section 20 while the other end of section 20 is secured to the lamp case B. Through section 20 is placed electric light wires 44 which are attached to the lamp 37 and the other end to a lead wire to a light socket.

The reflector 38 is secured within the lamp case B by a spring 39 within a recess within the end 30 of the case. The support and lamp case are constructed in such a manner that they can be taken apart when desired.

The body 33 of the lamp case has creases 32 at each end which fit over creases 31 in the end caps 29 and 30.

After the body 33 has been placed over the ends 29 and 30 a locking frame 34 is moved on the flange 35 to draw the lamp case firmly together.

Placed over a flange on the lower edge of frame 34 is another frame 36 having flanges on its top and bottom. Over the lower flange is placed the grooves of the camera thus holding the camera onto the lamp case B.

Section 11 of the support is threaded into a base 1 which has detachable side braces 2 and 3. One end of each brace has a thread therein in which is placed a thread on bolt 5 which is placed into a notch 4, and when the bolt is turned into the thread on the side braces, the side braces will be drawn into the notch 4 and by turning the bolt in the opposite direction the braces will be removed from the notches, the bolt has a right and left hand thread thereon for this operation.

In the front end of the base is placed a groove 8 in which a shaft 7 having wheels 6 thereon is placed and secured therein by a strap 9 and a screw 10. Upon the wheels the stand is moved over the floor.

Projecting from cap 15 is an arm 17 having longitudinal notches 23 therein. Upon the arm 17 is placed a table top 24 having a bracket 25 secured to its under side, said bracket having a flange 26 thereon which is placed into the notches 23 in such a manner that the flanges on the table top can be placed in any pair of notches to give the table any desired angle. On the outer end of the bracket is a spring 27 which fits over a knob 28 on the outer end of the arm 17 to lock the table top to the arm.

The table top 24 is used to lay a sensitized paper on for the enlarging of a picture and for many other purposes. A guard 40 is placed on one side of the table top 24 as a guide for the paper. The guard has springs 41 thereon which fit into sockets 42 on the table top for holding the guard on the table top.

On section 20 is placed a bracket 21 which is adjusted on the section by a thumb screw 22.

In the operation of the invention, sensitized paper is laid on the table top and a negative is placed in the camera in the manner as a glass is placed for the making of a negative in a camera. Light is now turned into the lamp which in turn strikes reflector and then striking the walls of the lamp case which are of a reflecting substance and then passing through the negative to the sensitized paper and showing the imprint of the negative on the paper. The light is left on the required length of time for the making of the print.

Having described the invention what I claim as new and desire to secure by Letters Patent, is:

1. In a picture enlarging apparatus combination of a base having detachable side braces therefor, said base having telescoping members projecting therefrom, one of said members having an arm secured thereto having longitudinal notches therein, a table top having flanges on the under side thereof to be placed in any pair of said notches to give the table top any desired angle and means for locking said table to said arm.

2. In a picture enlarging apparatus the combination of a base having detachable side braces therefor, said base having telescoping members extending upward therefrom, one of said telescoping members having an arm projecting therefrom, said arm having longitudinal notches therein, a table top having flanges on its under side, said flanges adapted to be placed in any two of said notches to give the table top any desired angle, means on said table for securing it to said arm, said other telescoping member having an arm projecting therefrom the outer end thereof having a lamp secured thereto, a lamp shade, said lamp shade having the lamp at one end thereof and a reflector at the other end therof, the ends of said lamp shade being detachable therefrom, said lamp shade having means thereon for attaching a camera thereto, means for supplying light to said lamp, all substantially as set forth.

3. In a picture enlarging apparatus, in combination with a camera, a lamp shade having a lamp in one end thereof and a reflector in the other end thereof, said lamp shade having a downward placed opening over which a camera is placed and through which light from said lamp is reflected through said camera for the enlarging of a picture within said camera upon a paper placed on a table, under said camera, upright for supporting said lamp shade, a base for said upright having detachable side braces thereto, said upright having an arm projecting therefrom having longitudinal notches therein for supporting said table, said table having flanges on its under surface to cooperate with the notches of the arm.

4. The combination in a picture enlarging apparatus, of a base having removable side braces therefor, an upright projecting from said base having an arm on the upper end thereof, a lamp shade attached to said arm having a lamp in one end thereof and a reflector in the other end thereof, said lamp shade having an opening downwardly thereof over which is placed a standard camera, the light from said lamp being reflected through the camera and picture therein for the enlarging thereof, said upright having another arm projecting therefrom having notches therein, a table having flanges on its under side thereof to fit within said notches, said table adapted to receive paper upon which the picture is to be enlarged and means for adjusting said camera from said table all substantially as set forth.

CARLOS M. GAXIOLA.